Feb. 13, 1962
G. O. PHILIP
3,021,464
TOOL DEPTH CONTROL SYSTEM
Filed March 27, 1958
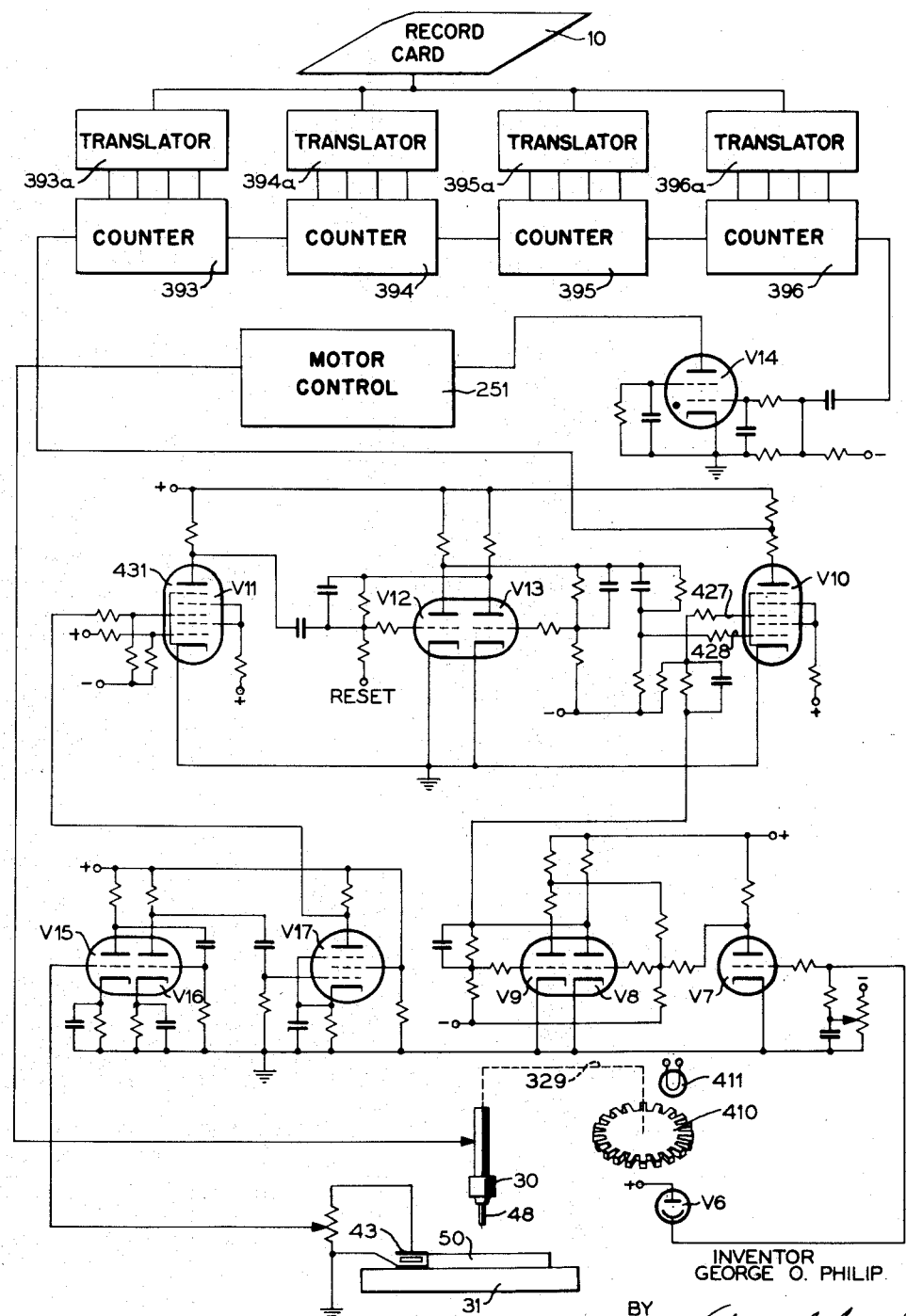
INVENTOR
GEORGE O. PHILIP.
BY
ATTORNEY – # United States Patent Office 3,021,464
Patented Feb. 13, 1962

3,021,464
TOOL DEPTH CONTROL SYSTEM
George O. Philip, Vestal, N.Y., assignor to International Business Machines Corporation, New York, N.Y., a corporation of New York
Filed Mar. 27, 1958, Ser. No. 724,471
6 Claims. (Cl. 318—162)

This invention relates generally to a system for determining the distance to be moved by a member and in particular to a system for determining the depth to which a tool carried in the spindle of a boring machine will be moved in a workpiece in response to a source of digital data.

In a boring machine where various operations are to be performed, such as boring, counterboring, etc., it is necessary that the depth of penetration into the workpiece be accurately controlled to provide the necessary precision in the finished product.

It is therefore an object of this invention to provide a condition responsive distance measuring apparatus for a movable member.

It is a further object of this invention to provide a condition responsive distance measuring apparatus for a movable member wherein said member is referred to a predetermined distance by a means responsive to its movement past a given point.

Another object of this invention is to provide an electromechanical transducer on an object which is responsive to the impingement of a movable member in said object for controlling circuitry preset by an information input to determine the subsequent movement of said movable member.

Another and further object of this invention is to provide a spindle feed control for a jig boring machine wherein the depth of feed into a workpiece is determined by a preset counter which is reset to zero by incremental movement of said spindle after a tool carried by said spindle contacts said workpiece.

Other objects of the invention will be pointed out in the following description and claims and illustrated in the accompanying drawings, which disclose, by way of examples, the principle of the invention and the best mode, which has been contemplated, of applying that principle.

In the drawings:

The FIGURE is a schematic illustration of the apparatus and circuit of the present invention.

A conventional punched card 10 has contained therein information in the form of punched holes. Each column of information or data represents in this instance a decimal order and for this apparatus four columns in the card are utilized. Conventional card reading apparatus is employed to sense the information contained in each column and to enter this information into counters 393–396 through a series of translating circuits 393a–396a. Each counter, therefore, will be responsive to a particular column of information. The detailed structure of the translators and counters will be found in application Serial No. 705,701, to M. Morgan, filed December 27, 1957, now Patent No. 2,901,927. The details in this application have been omitted to simplify the presentation.

The translators 393a–396a are essentially a switching network utilizing diodes to prevent back circuits wherein the output lines from the card reader, shown more particularly in the above-mentioned application, form the input and are energized in accordance with the decimal information contained therein. The translators 393–396a operate to break down each decimal line into a series of lines referrable to the various powers of two of its 9's complement in the following manner:

| Number | Complement | Binary | | | |
|---|---|---|---|---|---|
| | | $2^3$ | $2^2$ | $2^1$ | $2^0$ |
| 9 | 0 | 0 | 0 | 0 | 0 |
| 8 | 1 | 0 | 0 | 0 | 1 |
| 7 | 2 | 0 | 0 | 1 | 0 |
| 6 | 3 | 0 | 0 | 1 | 1 |
| -- | -- | -- | -- | -- | -- |
| 1 | 8 | 1 | 0 | 0 | 0 |

Each series of binary output line from each translator is connected to a four-stage binary counter to set the counter to a value in accordance with the energized lines.

The binary counters 393–396 are connected in a series arrangement to feed the carryover pulse from one counter to the next. While each counter operates on a binary scale, internal connections are made so that the carryover is in a decimal scale. The counters for this particular application are connected to represent thousandths (.000 to .009) counter 393; hundredths (.00 to .09) counter 394; tenths (.0 to .9) counter 395, and units (1–9) counter 396. It is of course apparent that these are merely representative and there could be more or less and could represent other decimal orders.

The counter 393 is the input for the chain while counter 396 is the output. As the complement of a series of numbers stored on record card 10 is stored in the counters 393–396, a number of pulses entered into the counter 393 will equal the number represented by the coded punchings on card 10 when there is an output from counter 396.

A digit generating device 410 is rotated by means 329 in accordance with the movement of the spindle toward a workpiece 50 in response to a motor control circuit 251. As the disc 410 rotates, light from lamp 411 is sequentially interrupted by successive teeth. The light interruptions are detected by a photodiode V6 in response to the fluctuations in light. While the disc is shown as having a series of serrations about its periphery, it is apparent that disc with holes about its periphery or an optical disc with opaque and transparent lines would work equally as well.

The circuit so far described has provision for entering a number in counters 393–396 equal to the complement of the depth of the hole desired in workpiece 50. In order to define the point at which the tool bit 48 will strike the workpiece 50 and initiate the measuring operation a piezoelectric crystal 43 is suitably mounted to the workpiece 51 and appropriately oriented in regard to the plane of vibration from the workpiece 50 to generate an electric signal when the tool bit 48 strikes workpiece 50.

By appropriate circuitry to be described infra, the signal generated by crystal 43 gates the pulses from the photodiode V6 to the first counter stage 393. The pulse generator 410 is rotated in accordance with the movement of spindle 30 toward workpiece 50 so that each degree of rotation represents a predetermined amount of movement of spindle 30 and consequently a predetermined amount of movement of tool bit 48. When the pulses from generator 410 are sufficient in number to operate the counter stages 393–396 to zero, the tool bit will have moved in the workpiece 50 to the depth predetermined by the information punched in card 10. The overflow pulse from counter 396 will operate a motor control 251, described in the above-mentioned application, to terminate movement of the spindle 30. The spindle 30 is rotated at predetermined velocities by means, not shown, to provide the cutting action of tool bit 48.

In the detailed operation of the gating circuitry, it is seen that light from source 411 causes conduction in photodiode V6 to allow the grid of V7 to rise while the darkening of the photodiode V6 does not allow the positive voltage applied to tube V6 to be applied to triode V7 and the negative bias shown at this last-mentioned tube is effective to keep the tube cut off. The trigger comprising triodes V8 and V9 is normally conducting through the right triode V8 with a lowered plate voltage. Each time the tube V7 conducts, the negative-going pulse from the plate of that tube biases V8 to nonconduction which raises the plate voltage of that tube which is applied to grid 427 of coincidence tube V10, and causes V9 to become conducting through the circuit shown. Upon termination of the positive pulse to tube V7 and the consequent positive pulse to tube V8, the trigger reverses conduction states and the voltage at grid 427 of tube V10 goes down.

The coincidence tube V10 controls the application of pulses to counter 393 by limiting conduction in this tube until both grids 427 and 428 are positive. The grid 428 is responsive to the impingement of the tool bit 48 on workpiece 50 in the following manner: The output from crystal 43 is amplified by tubes V15, V16 and V17 and transmitted to another control grid 431 of tube V11. This voltage from the crystal 43 results in the conduction of tube V11 with the resulting lowering of the plate voltage. The negative-going pulse to the grid of tube V12 causes the flip-flop composed of tubes V12 and V13 to switch so that tube V12 is nonconducting. The rise in plate voltage of tube V12 is transmitted to the control grid of 428 of tube V10 to condition this tube for conduction, upon receipt of counter pulses on the control grid 427 of tube V10. For each pulse from the pulse generator or shaft digitizer 410, the plate voltage of tube V10 drops to transmit a pulse. When the counter stages 393-396 are satisfied with the number of pulses from shaft digitizer 410, an overflow pulse from decade counter 396 will fire tube V14 and terminate movement of spindle 30 by virtue of the motor control 251.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A condition responsive distance measuring apparatus for a movable member comprising a circuit for algebraically summing a plurality of digital inputs, means responsive to equal digital inputs in said summing circuit to generate an output, means for entering a number into said circuit referrable to a predetermined distance said member is to travel, a digital generator for generating pulses in response to movement of said member and a condition responsive element for detecting movement of said member past a predetermined point for connecting said pulse generator to said summing circuit.

2. The apparatus of claim 1 including means responsive to the output circuit of said summing circuit for terminating movement of said member.

3. The apparatus of claim 2 wherein said condition responsive element comprises an electromechanical transducer positioned at said predetermined point and operable to generate an electrical signal.

4. The apparatus of claim 3 wherein said entering means comprises a complementary translator for translating a number equal to the pulses per desired distance into its complement.

5. In a machine tool control system for controlling the movement of a tool in a workpiece comprising a circuit for algebraically summing a plurality of digital inputs, means responsive to equal digital inputs in said summing circuit to generate an output, means for entering a number into said circuit referrable to a predetermined distance said tool is to move in said workpiece, a digital generator for generating pulses in response to the movement of said tool, a condition responsive element for detecting the contact of said tool against said workpiece, means responsive to said element for connecting said pulse generator to said summing circuit, and motor control means responsive to the overflow of said summing circuit for terminating movement of said tool.

6. The apparatus of claim 5 wherein said condition responsive element is mounted on said workpiece and is responsive to the impingement of said tool for generating an electric signal.

References Cited in the file of this patent
UNITED STATES PATENTS

| | | |
|---|---|---|
| 2,425,484 | Murrah | Aug. 12, 1947 |
| 2,479,293 | Bayless | Aug. 16, 1949 |
| 2,747,154 | Abrams | May 22, 1956 |
| 2,820,187 | Parsons et al. | Jan. 14, 1958 |
| 2,832,023 | Gough | Apr. 22, 1958 |
| 2,838,963 | Good et al. | June 17, 1958 |
| 2,848,670 | Kelling et al. | Aug. 19, 1958 |